July 26, 1927.

J. ALLEN 1,637,096

POULTRY DIPPING MECHANISM

Filed April 26, 1927      3 Sheets-Sheet 1

Inventor
John Allen

By Clarence A O'Brien
Attorney

July 26, 1927.

J. ALLEN 1,637,096

POULTRY DIPPING MECHANISM

Filed April 26, 1927 3 Sheets-Sheet 2

Inventor
John Allen,

By Clarence A. O'Brien
Attorney

July 26, 1927.
J. ALLEN
1,637,096
POULTRY DIPPING MECHANISM
Filed April 26, 1927    3 Sheets-Sheet 3
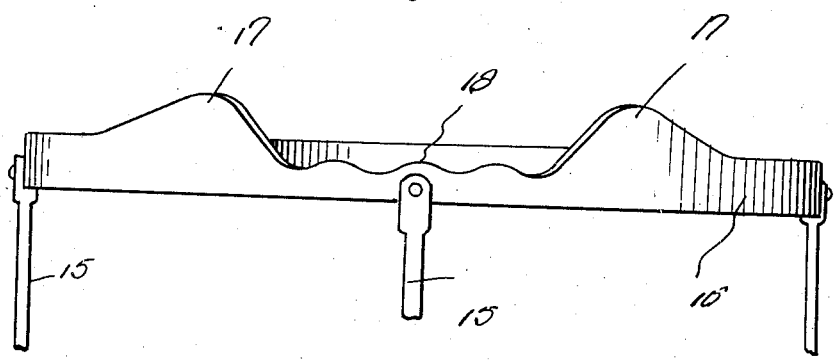
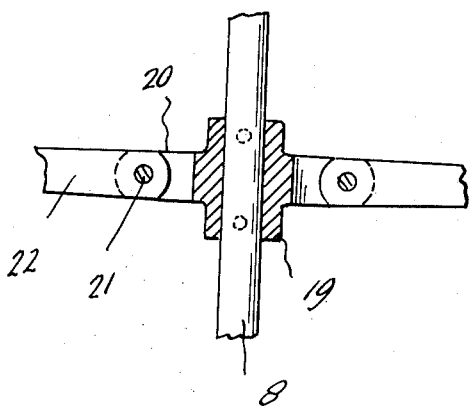
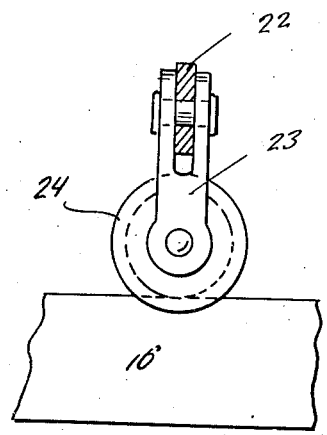
Inventor
John Allen
By Clarence A. O'Brien
Attorney

Patented July 26, 1927.

1,637,096

UNITED STATES PATENT OFFICE.

JOHN ALLEN, OF GREENSBURG, INDIANA.

POULTRY-DIPPING MECHANISM.

Application filed April 26, 1927. Serial No. 186,704.

This invention relates to new and useful improvements in machines for use in the dressing of chickens and other fowls, and aims to provide a highly novel, simple and efficiently operating device including means for dipping fowls within a hot bath and simultaneously agitating the same while within the bath with the result that the feathers may be easily picked after the fowls have been removed from the bath.

In carrying out my invention there is provided a fluid container together with slowly rotating units adjacent the containers that are constructed for receiving the fowls and that are actuated for causing the dipping of the fowl into the container and through the fluid therein and then raising the fowls therefrom so that they may be removed and properly picked.

An important object of the invention resides in the provision of fowl supporting means wherein the fowl may be readily attached to or removed therefrom, and this without requiring any extraneous fastening means. In the use of an apparatus of this character it has been ascertained by actual practice that the fowl can be picked in a rapid manner, and that when picked the skin is absolutely unblemished. Furthermore, the provision of an apparatus of this character permits the dressing of a large number of fowls in a short time and this without requiring a number of workmen.

In the drawings wherein like numerals indicate corresponding parts throughout the several views:

Figure 3 is a side elevation of a circular arm supporting trackway, said arms being provided for receiving at their outer ends the fowl to be dipped.

Figure 5 is a fragmentary section through a collar attached to a rotating post, said collar being constructed for facilitating the pivotal attachment of the inner ends of said arms thereto, and Figure 6 is a section through one of the arms outwardly of its respective supporting roller which bears upon and rides on said circular trackway.

Figure 1:
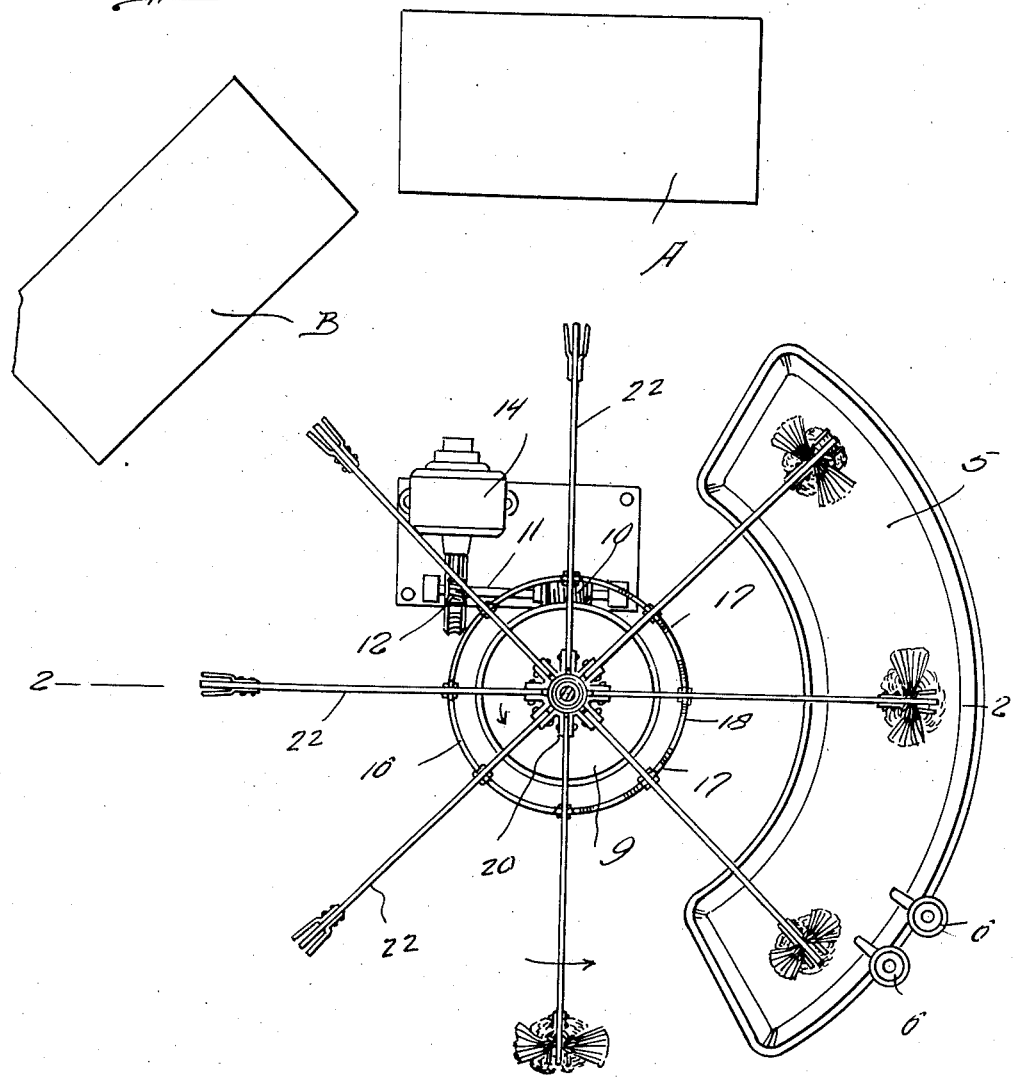
Figure 1 is a top plan view of my improved apparatus arranged adjacent two spaced tables, one of which is provided for supporting the undipped fowls, while the other is provided for supporting the dipped fowls so that the same may be properly picked.

Now having particular reference to the drawings, my novel apparatus consists of a fluid tank 5 of segmental formation as clearly indicated in Figure 1. Leading into the tank 5 are hot and cold water supply pipes 6—6, while leading from the tank is a drain pipe 7. Arranged at the inner side of said tank and at the center thereof is a vertical post 8 journaled at its opposite ends within floor and ceiling bearings so as to facilitate the easy rotation of said post. Upon the lower end of said post is a relatively large worm gear 9 that has mesh with a worm 10 upon a horizontal shaft 11, said shaft being also equipped with a small worm 12 in mesh with a large work gear 13 upon the adjacent end of the armature shaft of a suitable electric motor 14.

Supported in position surrounding the post 5 and slightly above the upper edge of the tank 5 by suitable vertical posts 15 is a circular track way 16. As clearly disclosed in Figure 3, the upper edge of this trackway within the confines of the tank 5 is formed beneath the upper edge of the remaining area of said trackway while at the ends thereof said upper edge of the trackway is formed with projections 17—17 that merge into the high and low points of the trackway to inclined surfaces as clearly indicated. The low point of the trackway between the projections 17—17 is waved as at 18 for a purpose hereinafter more fully described.

Figure 2:
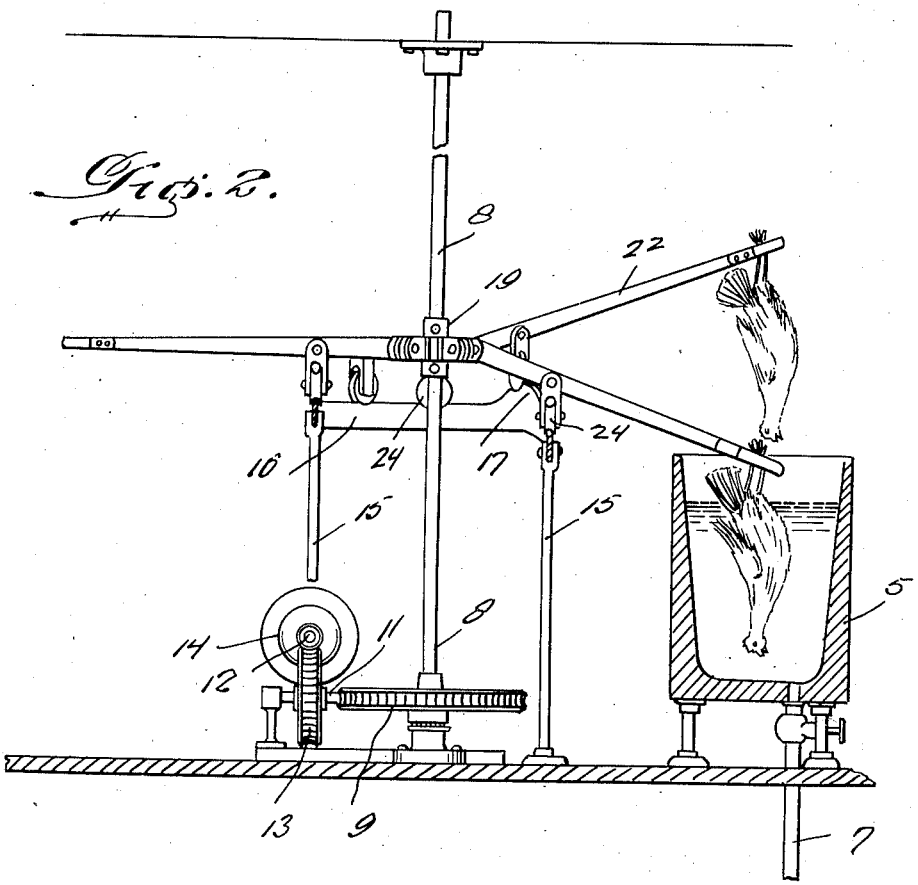
Figure 2 is a horizontal section taken substantially upon the line 2—2 of Figure 1.
Figure 4:
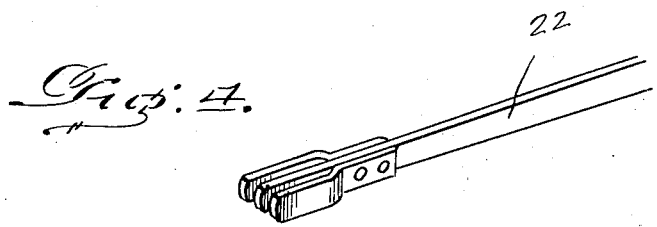
Figure 4 is a perspective of the fowl receiving end of one of the arms.

Keyed to the post 5 slightly above the upper edge of the trackway 16 is a collar 19 formed with a plurality of radiating and bifurcated tongues 20 between the branches of each of which is pivotally secured as at 21 a relatively elongated arm 22. The outer end of each arm is equipped preferably in the manner as indicated in Figure 4 so as to permit of the hanging of the legs of a fowl or a plurality of fowls thereon as suggested in Figures 1 and 2. Secured to each arm 22 directly above the circular trackway 16 and depending therefrom is a roller hanger 23 to which is attached a track engaging roller 24 for properly supporting the fowl hanging arms 22 with respect to the post 8.

Arranged adjacent the apparatus is a pair of spaced tables A and B, the table A being provided for receiving the dipped fowl, while table B is provided for receiving undipped fowls to be attached to the arms 22.

In actual practice the post 8 is slowly rotated by reason of the reduction gearing between the motor 18 and said post. The undipped fowls upon the table B are hung upon the ends of the arms 22 and during the rotation of the post the arms will be caused to travel in the direction of the arrow in Figure 1. Just before reaching the tank 5 the arm rollers riding upon the track 16 will meet the first hump 17 for causing the raising of the arm so that the fowl may pass beyond the adjacent end of the tank. After passing over said hump 17 the arm will drop onto the low point of the track so that the fowl will be dipped into the hot water or other material within said tank. By reason of the waved surface of the low point of the tank the arms will be caused to raise and lower with the result that the fowl feathers are properly plucked so that the fluid will act upon the entire body of the fowl, while the same are being passed longitudinally through the tank. Upon encountering the opposite hump 17 the arms will be raised from the tank and then when reaching the operator stationed adjacent the tables A and B the fowl may be removed from the arms and laid upon the table A after which the feathers may be rapidly picked.

It will thus be seen that I have provided a highly novel, simple, and efficiently operating fowl dipping mechanism that is well adapted for all the purposes heretofore designated and even though I have herein shown and described the invention as consisting of certain detail structural elements it is nevertheless to be understood that some changes may be made therein without affecting the spirit and scope of the appended claims.

Having thus described the invention, what I claim is:—

1. In a fowl dipping apparatus of the character described, a dipping tank, a plurality of movable and pivotal arms arranged adjacent said dipping tank, the outer ends thereof adapted for receiving the fowl to be dipped, means for moving the arms with respect to the tank and means for normally supporting the fowl carrying ends of the arms in position above the tank, said means being constructed to permit the downward movement of the fowl carrying ends of the arms when within the confines of the tank resulting in the dipping of the fowl within the tank.

2. In a fowl dipping apparatus of the character described, a dipping tank, a plurality of movable and pivotal arms arranged adjacent said dipping tank, the outer ends thereof adapted for receiving the fowl to be dipped, means for moving the arms with respect to the tank, means for normally supporting the fowl carrying ends of the arms in position above the tank, said means being constructed to permit the downward movement of the fowl carrying ends of the arms when within the confines of the tank resulting in the dipping of the fowl within the tank, and further means for causing the raising of the fowl carrying ends of the arm at the ends of the tank to raise the fowl considerably above the tank.

3. In a fowl dipping apparatus of the character described, a dipping tank, a vertical shaft mounted for rotation adjacent the tank, a plurality of arms pivoted at their inner ends to the shaft at a point slightly above the tank, the outer ends of the arms being adapted for receiving the fowl to be dipped, means for normally supporting the outer ends of the arms in position above the tank, said means being constructed for permitting the fowl carrying ends of the arms to drop under their own weight and the hanging of the fowl thereon when the ends of the arms are in position within the ends of the tank.

4. In a fowl dipping apparatus of the character described, a dipping tank, a vertical shaft mounted for rotation adjacent the tank, a plurality of arms pivoted at their inner ends to the shaft at a point slightly above the tank, the outer ends of the arms being adapted for receiving the fowl to be dipped, means for normally supporting the outer ends of the arms in position above the tank, said means being constructed for permitting the fowl carrying ends of the arms to drop under their own weight and the hanging of the fowl thereon when the ends of the arms are in position within the ends of the tank, and means for causing the raising of the fowl carrying ends of the arms when approaching the ends of said tank.

5. In a fowl dipping apparatus of the character described, a dipping tank, a vertical shaft mounted for rotation adjacent the tank, a circular trackway arranged around the shaft and at the top of the tank, a plurality of radiating arms pivoted at their inner ends to the shaft above said tank, and means associated with the arms for engagement with the track for supporting said arms normally in horizontal position above the top of the tank, said track being formed within the ends of the tank with a low point to permit the outer ends of the arms to drop under their own weight and the weight of the fowl arranged thereon so that said fowl will dip into the tank, and means for causing the rotation of the shaft.

6. In a fowl dipping apparatus of the character described, a dipping tank, a vertical shaft mounted for rotation adjacent the tank, a circular trackway arranged around the shaft and at the top of the tank, a plurality of radiating arms pivoted at their inner ends to the shaft above said tank, and means associated with the arms for engagement with the track for supporting said arms normally in horizontal position above the top of the tank, said track being formed within the ends of the tank with a low point to permit the outer ends of the arms to drop under their own weight and the weight of the fowl arranged thereon so that said fowl will dip into the tank, means for causing the rotation of the shaft, and projections at the ends of the low point in the tank to cause the high elevation of the fowl carrying ends of the arm when approaching the ends of said tank.

In testimony whereof I affix my signature.

JOHN ALLEN.